United States Patent
Yang

(10) Patent No.: US 7,008,212 B2
(45) Date of Patent: Mar. 7, 2006

(54) MOLDING APPARATUS WITH REMOVABLE MOLD CORES

(75) Inventor: Chuan-Hui Yang, Taichung (TW)

(73) Assignee: Asia Optical Co., Inc., Taichung (TW)

( * ) Notice: Subject to any disclaimer, the term of this patent is extended or adjusted under 35 U.S.C. 154(b) by 96 days.

(21) Appl. No.: 10/840,636

(22) Filed: May 7, 2004

(65) Prior Publication Data

US 2005/0175727 A1    Aug. 11, 2005

(30) Foreign Application Priority Data

Feb. 6, 2004   (TW) ............................... 93102812 A

(51) Int. Cl.
*B29C 33/30*    (2006.01)

(52) U.S. Cl. .................. 425/195; 425/192 R; 425/808; 249/120; 249/139

(58) Field of Classification Search ................ 425/185, 425/190, 192 R, 193, 195, 186, 468, 808; 249/120, 139

See application file for complete search history.

(56) References Cited

U.S. PATENT DOCUMENTS

| | | | | |
|---|---|---|---|---|
| 2,424,235 A | * | 7/1947 | Hoffre | 249/53 R |
| 2,448,827 A | * | 9/1948 | Reder, Jr. | 164/241 |
| 3,981,477 A | * | 9/1976 | Armbrust et al. | 249/135 |
| 4,150,931 A | * | 4/1979 | Gabrys | 425/186 |
| 4,911,632 A | * | 3/1990 | Mansfield | 425/183 |
| 6,328,921 B1 | * | 12/2001 | Marshall et al. | 264/279.1 |

* cited by examiner

*Primary Examiner*—Donald Heckenberg
(74) *Attorney, Agent, or Firm*—Banner & Witcoff, Ltd.

(57) ABSTRACT

A molding apparatus for lenses includes first and second molding units, each of which has a mold core holder, a plurality of mold cores disposed in the mold core holder, and a clamp unit provided within the mold core holder. The mold core holder has an abutment surface, and a plurality of cavities extending inwardly from the abutment surface and receiving respectively the mold cores. The cavities include cavity walls, respectively. The clamp unit includes a plurality of clamp elements attached to the clamp unit to clamp respectively the mold cores against the cavity walls. Individual removal of the mold cores of the molding units for replacement is permitted by operating the clamp elements.

16 Claims, 5 Drawing Sheets

MOLDING APPARATUS WITH REMOVABLE MOLD CORES

CROSS-REFERENCE TO RELATED APPLICATION

This application claims priority of Taiwanese Application No. 093102812, filed on Feb. 6, 2004.

BACKGROUND OF THE INVENTION

1. Field of the Invention

The invention relates to a molding apparatus for lenses, more particularly to a molding apparatus that has individually removable mold cores.

2. Description of the Related Art

Referring to FIG. 1, a currently available molding apparatus for lenses includes a lower mold unit 1 and an upper mold unit 2 facing the lower mold unit 1. The lower mold unit 1 has a lower mold core holder 101, a plurality of lower mold cores 102 disposed within the lower mold core holder 101, and a lower fixed seat 103 to be fixed to a bottom portion of the lower mold core holder 101 so as to retain the lower mold cores 102 in the lower mold core holder 101. The lower mold core holder 101 is formed with a plurality of lower mold core holes 104, each of which has a narrow upper portion and a wider lower portion. Each of the lower mold cores 102 has a shape corresponding to that of a respective one of the lower mold core holes 104. After the lower mold cores 102 are inserted respectively into the lower mold core holes 104, the lower fixed seat 103 is secured to the bottom portion of the lower mold core holder 101 so that the lower mold cores 102 are retained in the lower mold core holes 104.

The upper mold unit 2 has an upper mold core holder 201, a plurality of upper mold cores 202 disposed within the upper mold core holder 201, and an upper fixed seat 203 to be fixed to a top portion of the upper mold core holder 201 so as to retain the upper mold cores 202 in the upper mold core holder 201. The upper mold core holder 201 is formed with a plurality of upper mold core holes 204, each of which has a narrow lower portion and a wider upper portion. Each of the upper mold cores 202 has a shape corresponding to that of a respective one of the upper mold core holes 204. After the upper mold cores 202 are inserted respectively into the upper mold core holes 204, the upper fixed seat 203 is secured to the top portion of the upper mold core holder 201 so that the upper mold cores 202 are retained in the upper mold core holes 204.

Although the aforementioned molding apparatus can achieve its intended purpose, it has the following disadvantages:

1. When inspection of the molded lenses indicates that forming surfaces of some of the lower and upper mold cores 102, 202 are damaged, the defective lower and upper mold cores 102, 202 have to be removed and replaced. To remove the defective lower and upper mold cores 102, 202, the lower and upper fixed seats 103, 203 have to be detached from the bottom and top portions of the lower and upper mold core holders 101, 201, respectively. To remove the lower and upper fixed seats 103, 203 from the lower and upper mold core holders 101, 201, the machine has to be stopped first, and the whole molding apparatus is detached from a machine platform to which the molding apparatus is attached. As such, removal and replacement operations of the defective lower and upper mold cores 102, 202 are not only complicated and time-consuming, but adversely affect the production efficiency as well due to interruption during the molding process.

2. Through the outer diameter tolerance of the lower and upper mold cores 102, 202 that cooperate with the inner diameter tolerance of the lower and upper mold core holes 104, 204 to produce a clearance, the lower and upper mold cores 102, 202 can be easily put in and removed from the lower and upper mold core holes 104, 204. However, due to the presence of the clearances, concentricity problem between the lower and upper mold cores 102, 202 exists, which may result in defective products during the production of the lenses.

SUMMARY OF THE INVENTION

Therefore, the object of the present invention is to provide a molding apparatus that has a plurality of mold cores which can be individually and quickly replaced so as to enhance production efficiency and that can ensure concentricity between upper and lower mold cores.

According to one aspect of this invention, a molding apparatus for lenses comprises a molding unit and a clamp unit. The molding unit has a mold core holder, and a plurality of mold cores disposed in the mold core holder. The mold core holder has an abutment surface adapted to abut against a complementary molding unit, and a plurality of cavities extending inwardly from the abutment surface and receiving respectively the mold cores. The cavities include cavity walls, respectively. The clamp unit is provided within the mold core holder, and includes a plurality of clamp elements attached to the clamp unit to clamp respectively the mold cores against the cavity walls. Individual removal of the mold cores of the molding unit for replacement is permitted by operating the clamp elements.

According to another aspect of this invention, a molding apparatus for lenses comprises a first molding unit, and a second molding unit facing the first molding unit. Each of the first and second molding units has a mold core holder, a plurality of mold cores disposed in the mold core holder, and a clamp unit provided within the mold core holder. The mold core holder has an abutment surface, and a plurality of cavities extending inwardly from the abutment surface and receiving respectively the mold cores. The cavities include cavity walls, respectively. The clamp unit includes a plurality of clamp elements attached to the clamp unit to clamp respectively the mold cores against the cavity walls. Individual removal of the mold cores of the first and second molding units for replacement is permitted by operating the clamp elements.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 4:
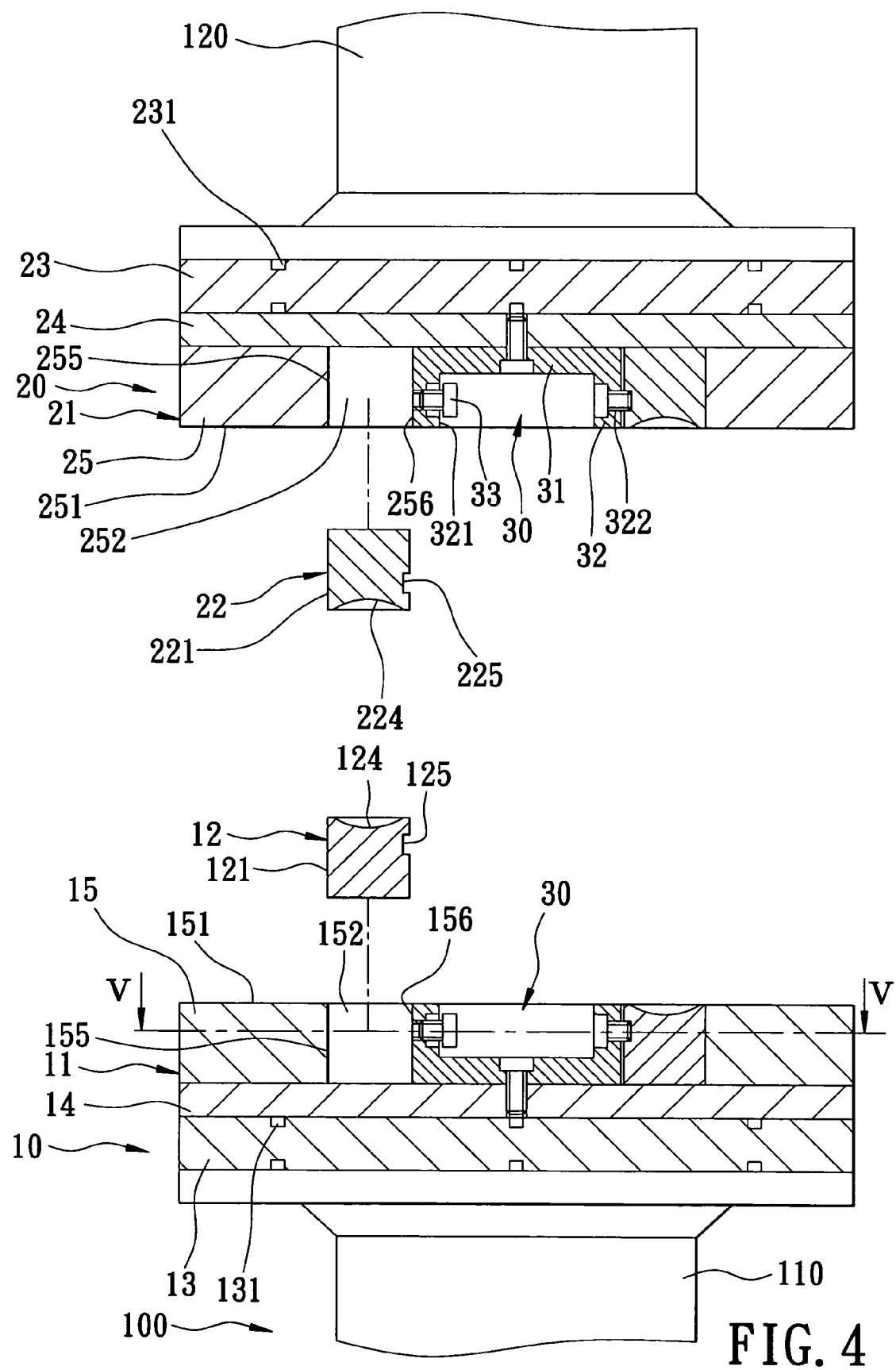
FIG. 4 is a fragmentary, partly exploded, schematic sectional view of the preferred embodiment.
Figure 5:
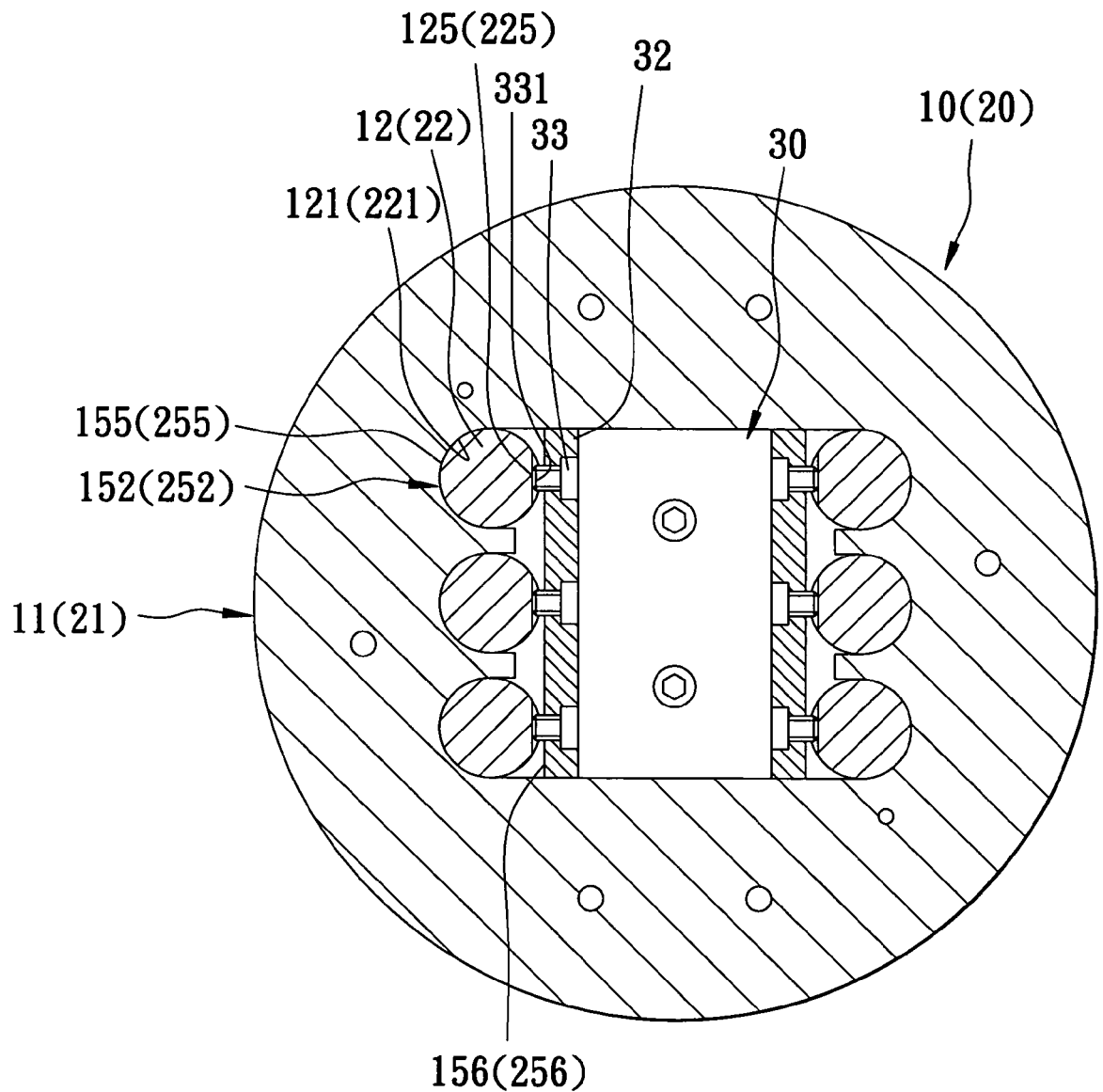
FIG. 5 is a sectional view of the preferred embodiment taken along line V—V of FIG. 4.

Referring to FIGS. 2 to 5, the preferred embodiment of a molding apparatus for lenses according to the present invention is adapted to be mounted on a support assembly 100. The support assembly 100, as shown in FIG. 4, includes a first support seat 110 and a second support seat 120 opposite to the first support seat 110. The molding apparatus of the present invention comprises a first molding unit 10 mounted on the first support seat 110, and a second molding unit 20 mounted on the second support seat 120 and facing the first molding unit 10.

Each of the first and second molding units 10, 20 has a mold core holder 11, 21, a plurality of mold cores 12, 22, and a clamp unit 30.

The mold core holder 11, 21 includes a base plate 13, 23, a cooling plate 14, 24 superimposed upon the base plate 13, 23, and a mold plate 15, 25 superimposed upon the cooling plate 14, 24. The base plate 13, 23, the cooling plate 14, 24, and the mold plate 15, 25 are secured together to form a unitary body. The base plate 13, 23 is formed with a plurality of cooling channels 131, 231 facing the cooling plate 14, 24. The mold core holder 11, 21 further has an abutment surface 151, 251 on the mold plate 15, 25, amounting hole 153, 253 formed through the mold plate 15, 25 and extending inwardly from the abutment surface 151, 251, and a plurality of cavities 152, 252 formed through the mold plate 15, 25 and extending inwardly from the abutment surface 151, 251. The cavities 152, 252 receive respectively the mold cores 12, 22, and are formed at two opposite sides of and are in spatial communication with the mounting hole 153, 253. The cavities 152, 252 include cavity walls 155, 255, respectively. The cooling plate 14, 24 covers the cavities 152, 252 and the mounting hole 153, 253. In this embodiment, each of the cavity walls 155, 255 of the cavities 152, 252 has a narc-shaped cross-section.

The mold cores 12, 22 are disposed respectively in the cavities 152, 252 in the mold plate 15, 25. Each of the mold cores 12, 22 is cylindrical, and has a peripheral wall 121, 221 extending around an axis, and a forming face 124, 224 formed in an end surface of the respective mold core 12, 22. The cavity wall 155, 255 of each cavity 152, 252 extends angularly relative to the axis of the respective mold core 12, 22. The peripheral wall 121, 221 of each of the mold cores 12, 22 has an engaging recess 125, 225. The forming face 124, 224 can be formed as a concave face, a convex face, or a planar face depending on the desired shape of the lens to be formed.

The clamp unit 30 is provided within the corresponding mold core holder 11, 21, and includes a clamp body 31 fitted within the mounting hole 153, 253 in the mold core holder 11, 21, and a plurality of clamp elements 33 attached to the clamp body 31 to clamp respectively the mold cores 12, 22 against the cavity walls 155, 255. The clamp body 31 has a base wall 311 screwed to the cooling plate 14, 24, and two lateral clamp walls 32 extending upwardly from and connected integrally to two opposite side edges of the base wall 311. The cavities 152, 252 are formed in the mold core holder 11, 21 at two opposite sides of the clamp body 31. Each of the clamp walls 32 has a first surface 156, 256 facing the cavity walls 155, 255, a second surface 321 opposite to the first surface 156, 256, and a plurality of screw holes 322 extending from the first surface 156, 256 to the second surface 321. In this embodiment, each of the clamp elements 33 is formed as a clamping screw, which extends threadedly through a corresponding screw hole 322 in the clamp walls 32 and which has an engaging end 331 to engage the engaging recess 125, 225 in the peripheral wall 121, 221 of the corresponding mold core 12, 22.

Referring once again to FIGS. 3, 4 and 5, before the engaging end 331 of each clamp element 33 is extended through the first surface 156, 256 of the respective clamp wall 32, the mold cores 12, 22 are inserted into the respective cavities 156, 256, with the engaging recesses 125, 225 facing the first surface 156, 256 of the corresponding clamp wall 32. Afterwards, each clamp element 33 is operated by a tool (not shown) so as to drive the engaging end 331 through the second surface 321 and out of the first surface 156, 256 of the corresponding clamp wall 32 for engaging the engaging recess 125, 225 in the respective mold core 12, 22. The engaging end 331 of each clamp element 33 thus moves radially and presses the respective mold core 12, 22 against the corresponding cavity wall 155, 255, thereby positioning the respective mold core 12, 22 within the respective cavity 152, 252. At this time, a portion of the peripheral wall 121, 221 of each mold core 12, 22 is surrounded by a respective cavity wall 155, 255, and the mold cores 12, 22 are positioned within the first and second molding units 10, 20 with an accurate concentricity relative to the cavities 152, 252. When nitrogen air is guided into the cooling channels 131, 231 in the base plate 13, 23, it can be distributed uniformly on the cooling plate 14, 24, thereby cooling the mold cores 12, 22 evenly.

When one of the mold cores 12, 22 is damaged and needs to be replaced, it is not necessary to detach the first and second molding units 10, 20 from the first and second supporting seats 110, 120. Instead, a tool (not shown) is used to operate and loosen the clamp element 33 from the damaged mold core 12, 22 so that the engaging end 331 moves out of the engaging recess 125, 225 in the damaged mold core 12, 22. As such, the damaged mold core 12, 22 can be removed easily from the respective cavity 152, 252 for replacement. After replacement, the clamp element 33 is once again threaded into the respective screw hole 322, with the engaging end 331 extending into the engaging recess 125, 225 in the corresponding mold core 12, 22, using the same tool.

Therefore, the molding apparatus of the present invention does not require removal of the whole apparatus from the support assembly 100 to replace damaged mold cores 12, 22 during the production of lenses. By simply operating the clamp elements 33, the damaged mold cores 12, 22 can be easily and quickly replaced. As such, not only is the replacement time reduced, but production rate of the molding apparatus in forming lenses can be maintained as well, thereby enhancing production efficiency. Furthermore, through the clamp elements 33 of the clamp unit 30 that clamp and position the mold cores 12, 22 against the cavity walls 155, 255, concentricity of the mold cores 12, 22 can be ensured, thereby enhancing yield of good quality lenses.

It should be noted that the clamp walls 32 of the clamp unit 30 may be formed as independent pieces. Each of the mold cores 12, 22 can be polygonal. Each of the cavity walls 155, 255 may have a shape corresponding to that of the respective mold core 12, 22.

Figure 1:
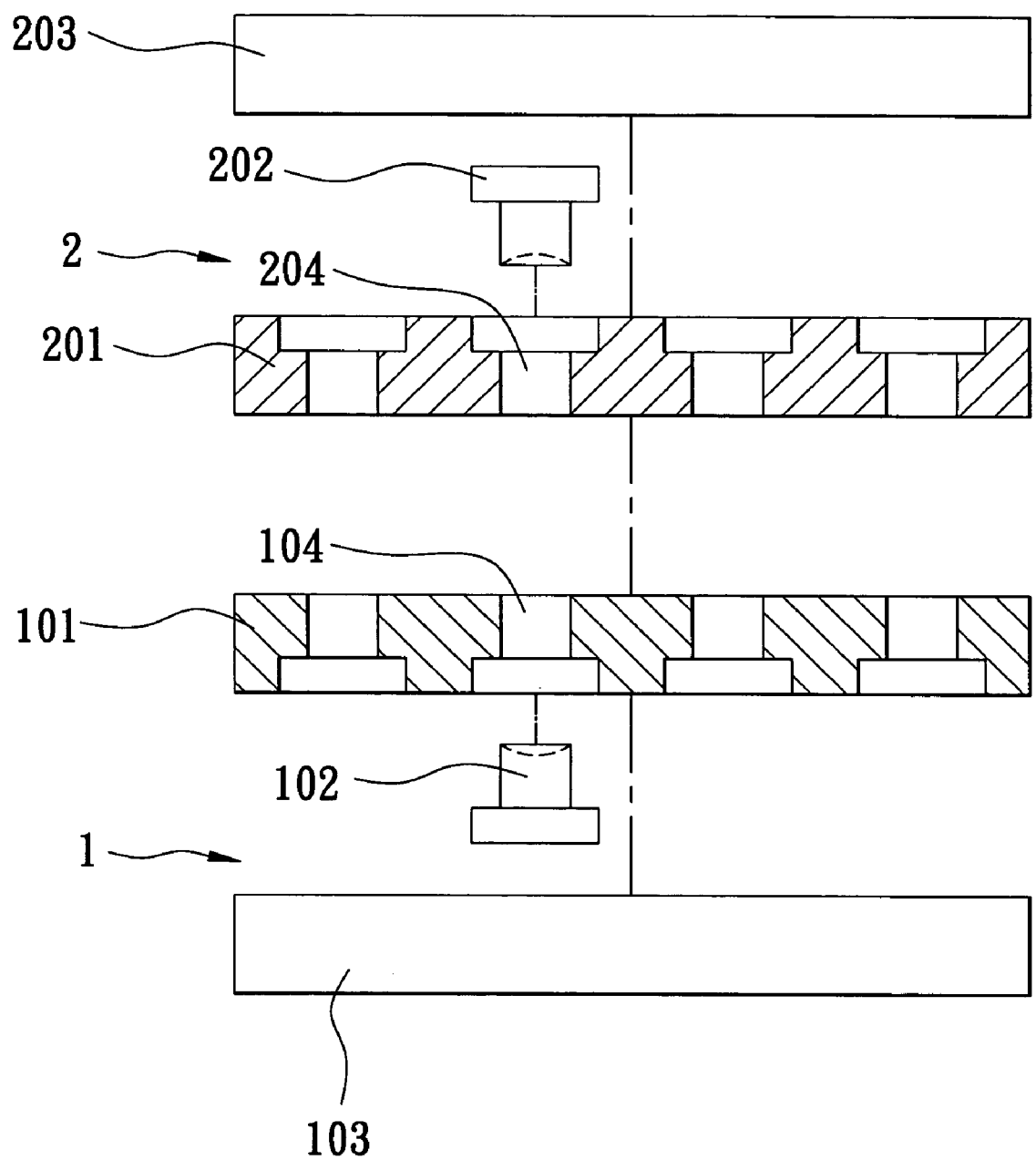
FIG. 1 is a partly sectional exploded schematic view of a currently available molding apparatus for lenses.
Figure 2:
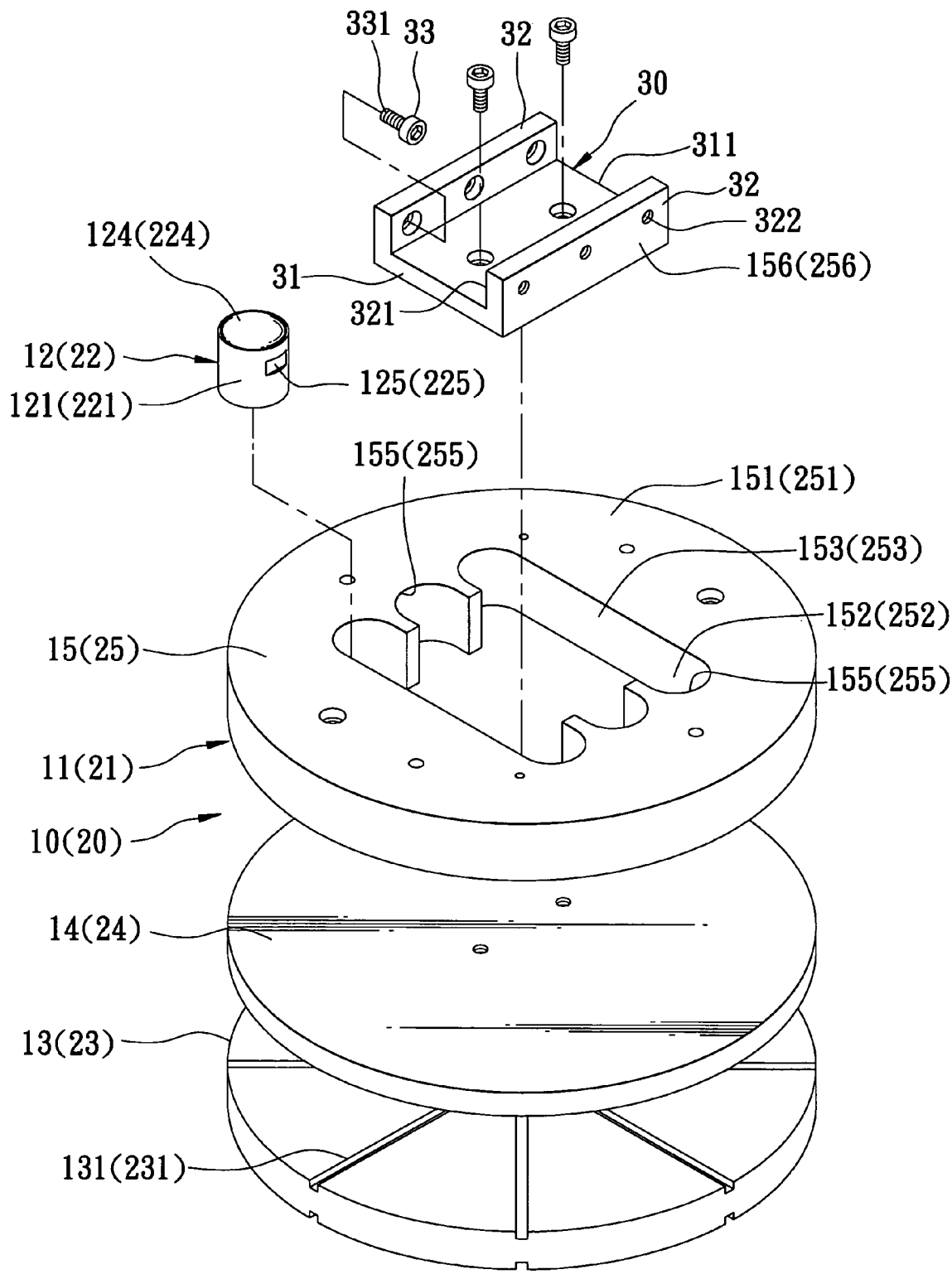
FIG. 2 is an exploded perspective view of the preferred embodiment of a molding apparatus for lenses according to the present invention.
Figure 3:
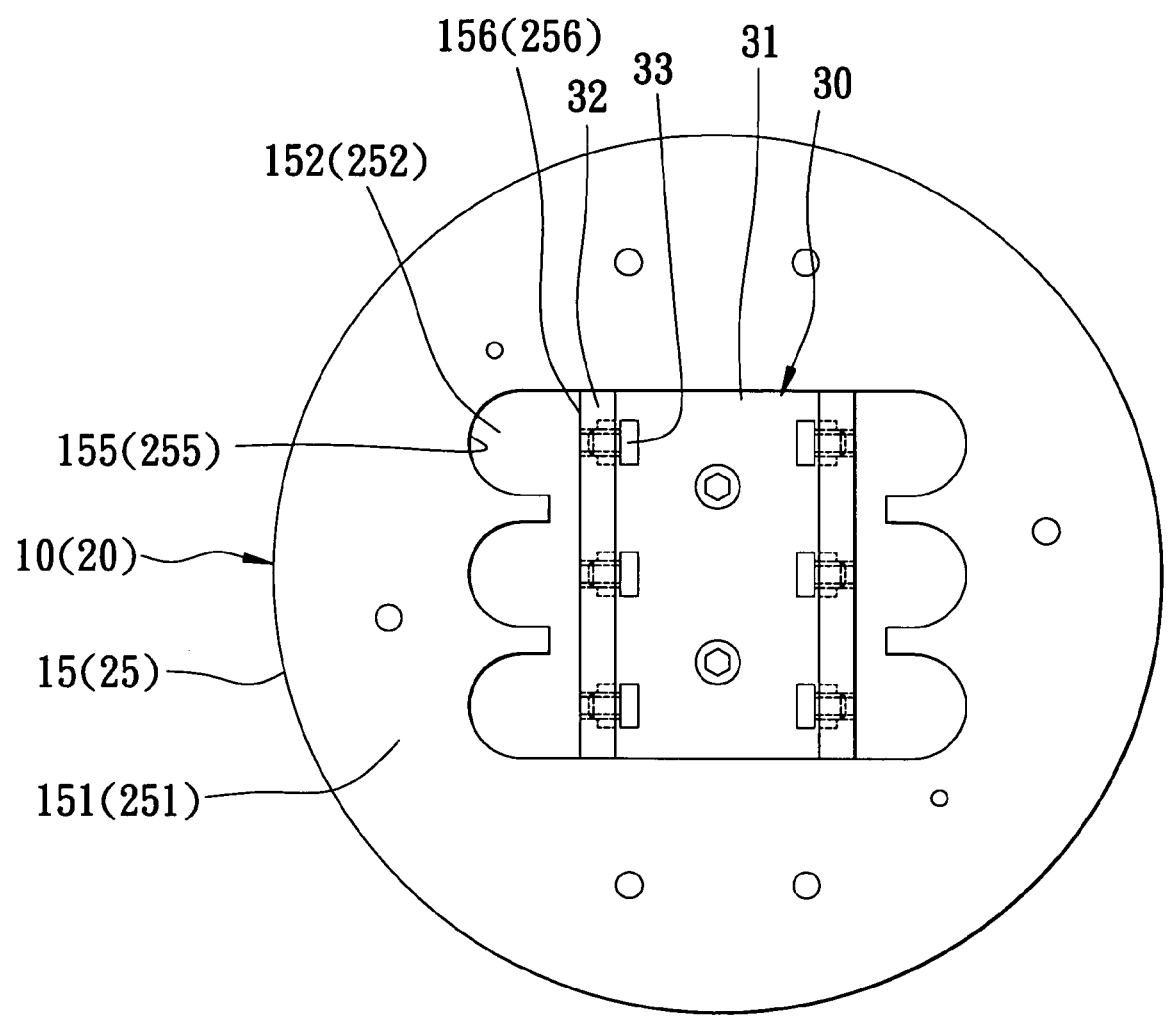
FIG. 3 is a top schematic view of the preferred embodiment in an assembled state.

Apart from the embodiment as described above, the first molding unit 10 of the present invention can be used in conjunction with the upper mold unit 2 of the conventional molding apparatus shown in FIG. 1, and the second molding unit 20 of the present invention can be used in conjunction with the lower mold unit 1 of the conventional molding apparatus shown in FIG. 1. The aforementioned advantage of quick replacement can be similarly achieved.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. A molding apparatus for lenses, comprising:
   a molding unit having a mold core holder and a plurality of mold cores disposed in said mold core holder, said mold core holder having an abutment surface adapted to abut against a complementary molding unit, and a plurality of cavities extending inwardly from said abutment surface and receiving respectively said mold cores, said cavities respectively including cavity walls; and
   a clamp unit provided within said mold core holder, and including a plurality of clamp elements attached to said clamp unit to clamp respectively said mold cores against said cavity walls;
   whereby individual removal of said mold cores of said molding unit for replacement is permitted by operating said clamp elements.

2. The molding apparatus as claimed in claim 1, wherein said clamp unit further includes a clamp body fitted within said mold core holder, said cavities being formed in said mold core holder at least at two opposite sides of said clamp body, said clamp body having two opposite clamp walls facing said cavity walls.

3. The molding apparatus as claimed in claim 2, wherein each of said mold cores has an axis and a peripheral wall extending around said axis, each of said cavity walls extending angularly relative to said axis, said peripheral wall of each of said mold cores having a portion surrounded by a respective one of said cavity walls.

4. The molding apparatus as claimed in claim 2, wherein said mold core holder further has a mounting hole extending inwardly from said abutment surface to receive said clamp body, said cavities being formed at two opposite sides of and being in spatial communication with said mounting hole.

5. The molding apparatus as claimed in claim 3, wherein said mold cores are cylindrical, each of said cavity walls having an arc-shaped cross-section.

6. The molding apparatus as claimed in claim 3, wherein each of said clamp elements is formed as a clamping screw which extends threadedly through a corresponding one of said clamp walls and which has an engaging end to engage said peripheral wall of the respective one of said mold cores.

7. The molding apparatus as claimed in claim 6, wherein said peripheral wall of each of said mold cores has an engaging recess to engage said engaging end of the respective one of said clamping screws.

8. The molding apparatus as claimed in claim 4, wherein said mold core holder includes a base plate, a cooling plate superimposed upon said base plate, and a mold plate superimposed upon said cooling plate, said base plate, said cooling plate and said mold plate being secured together, said cavities and said mounting hole extending through said mold plate, said cooling plate covering said cavities and said mounting hole, said base plate being formed with a plurality of cooling channels.

9. A molding apparatus for lenses, comprising:
   a first molding unit; and
   a second molding unit facing said first molding unit;
   each of said first and second molding units having a mold core holder, a plurality of mold cores disposed in said mold core holder, and a clamp unit provided within said mold core holder, said mold core holder having an abutment surface and a plurality of cavities extending inwardly from said abutment surface and receiving respectively said mold cores, said cavities respectively including cavity walls, said clamp unit including a plurality of clamp elements attached to said clamp unit to clamp respectively said mold cores against said cavity walls;
   whereby individual removal of said mold cores of said first and second molding units for replacement is permitted by operating said clamp elements.

10. The molding apparatus as claimed in claim 9, wherein said clamp unit further includes a clamp body fitted within said mold core holder, said cavities being formed in said mold core holder at least at two opposite sides of said clamp body, said clamp body having two opposite clamp walls facing said cavity walls.

11. The molding apparatus as claimed in claim 10, wherein each of said mold cores has an axis and a peripheral wall extending around said axis, each of said cavity walls extending angularly relative to said axis, said peripheral wall of each of said mold cores having a portion surrounded by a respective one of said cavity walls.

12. The molding apparatus as claimed in claim 10, wherein said mold core holder further has a mounting hole extending inwardly from said abutment surface to receive said clamp body, said cavities being formed at two opposite sides of and being in spatial communication with said mounting hole.

13. The molding apparatus as claimed in claim 11, wherein said mold cores are cylindrical, each of said cavity walls having an arc-shaped cross-section.

14. The molding apparatus as claimed in claim 11, wherein each of said clamp elements is formed as a clamping screw which extends threadedly through a corresponding one of said clamp walls and which has an engaging end to engage said peripheral wall of the respective one of said mold cores.

15. The molding apparatus as claimed in claim 14, wherein said peripheral wall of each of said mold cores has an engaging recess to engage said engaging end of the respective one of said clamping screws.

16. The molding apparatus as claimed in claim 12, wherein said mold core holder includes a base plate, a cooling plate superimposed upon said base plate, and a mold plate superimposed upon said cooling plate, said base plate, said cooling plate and said mold plate being secured together, said cavities and said mounting hole extending through said mold plate, said cooling plate covering said cavities and said mounting hole, said base plate being formed with a plurality of cooling channels.

* * * * *